June 25, 1957 H. L. HORWITZ ET AL 2,797,262

AUTOMATIC TELEPHONE SYSTEMS

Filed April 29, 1954 5 Sheets-Sheet 1

INVENTOR
H. L. HORWITZ
G. L. HASSER
BY [signature]
ATTORNEY

INVENTOR
H. L. HORWITZ
G. L. HASSER
BY [signature]
ATTORNEY

INVENTOR
H. L. HORWITZ
G. L. HASSER
BY
ATTORNEY

INVENTOR
H. L. HORWITZ
G. L. HASSER
BY E. D. Phinney
ATTORNEY

INVENTOR
H. L. HORWITZ
G. L. HASSER
BY E. D. Phinney
ATTORNEY

United States Patent Office 2,797,262 Patented June 25, 1957

2,797,262

AUTOMATIC TELEPHONE SYSTEMS

Henry Leopold Horwitz, Nutley, and George Louis Hasser, Packanack Lake, N. J., assignors to International Telephone and Telegraph Corporation, New York, N. Y., a corporation of Maryland Application April 29, 1954, Serial No. 426,516

11 Claims. (Cl. 179—27)

This invention relates to automatic telephone systems and more particularly to multi-office area systems in which toll calls are extended via a tandem office to a tributory or terminating office over trunks used for both extended area and toll service.

One object of the invention is to prevent local subscribers in the tandem office from using the toll features of the tributory office. According to one feature of the invention this is accomplished by sending a supervisory signal to the repeater in the tandem office, during the interdigital time of the number dialled, by a switch assigned only for toll service (for example, for setting up verification calls) for the purpose of preventing further dialing if the call is originated by a local subscriber in the tandem office.

According to a further feature of the invention the repeater in the tandem office is arranged to distinguish by means of a forward ground on the private wire that the call is either originated locally or from the toll board, and the repeater is arranged to prevent further dialing as soon as the answer supervisory signal is received when the call is originated by a local subscriber in the tandem office.

According to another feature of the invention, when the trunk lines from the tandem office to the tributory office are used for both extended area and toll service, this repeater extends answer supervisory signals immediately but introduces a delay in response to the signal itself to permit further dialing if the call is originated from a toll board. This repeater has two paths of access, and on outgoing toll calls, dependent upon the path of access over which it is taken into use, it is arranged to send automatically a single impulse in order to permit a subscriber in the tributory office to reach the toll board via the equipment in the tandem office by dialing a single digit.

According to a still further feature of the invention the auto-to-manual repeater which is utilized at the tandem office to receive calls from and extend calls to the toll board has two points of access for outgoing calls, one providing answer supervision for calls originated locally in the tandem office, and the other arranged to pass answer supervision for calls originated in the tributory office.

These and other features of the invention pointed out in the appended claims will be understood from a consideration of the following detailed description of one embodiment of the invention taken in conjunction with the accompanying drawings.

In the accompanying drawings

Figure 1:
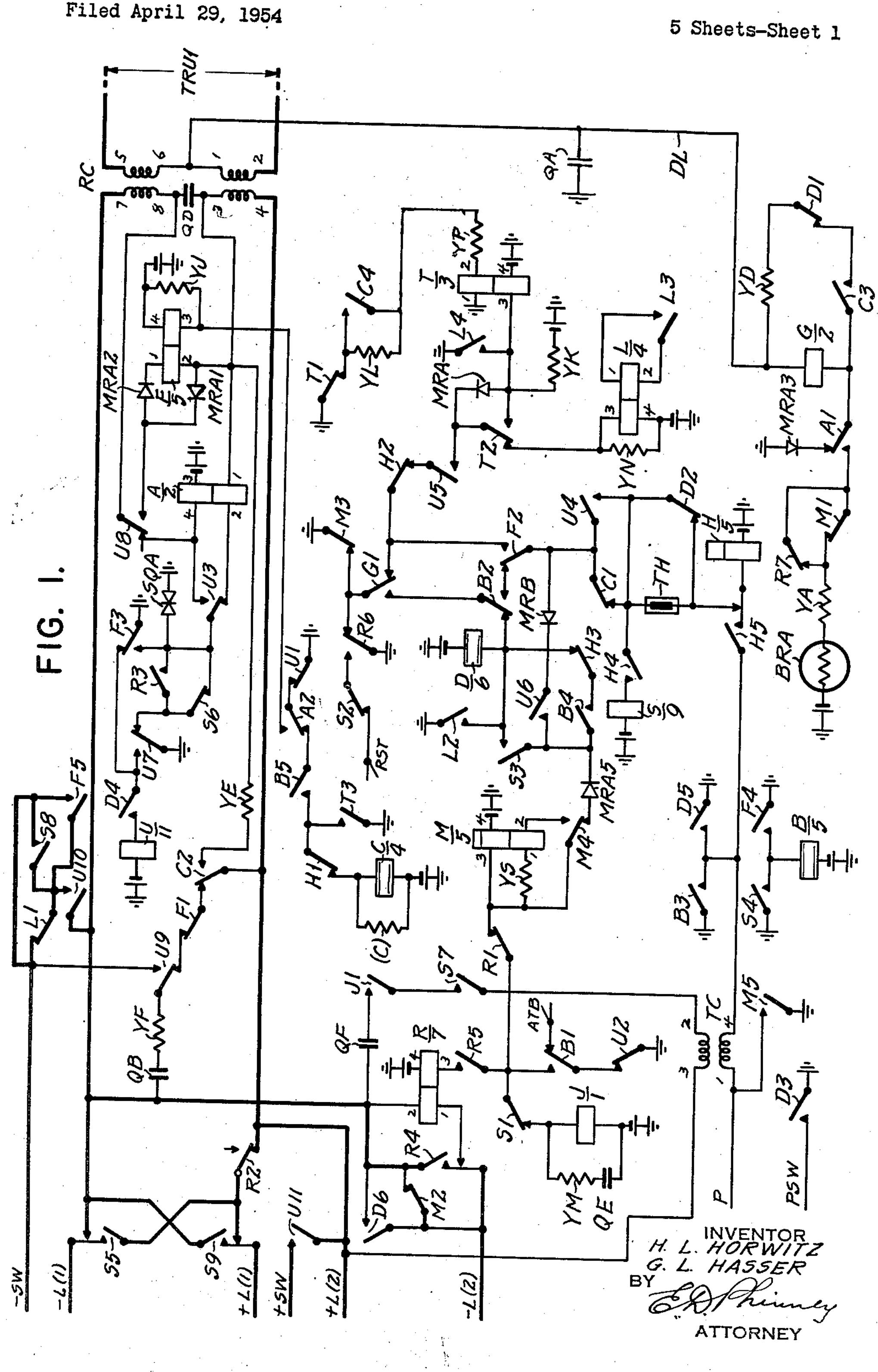
Fig. 1 is a circuit diagram of the two-way auto-to-auto repeater at the tributory or terminating office.

In the drawings, as is common in present day automatic telephone switching practice, the relay contacts are shown divorced from their associated relay coils. In order to simplify the reading of these circuits, the relays and their associated contacts are given corresponding reference letters. For example, the relay F, in Fig. 1, is given the reference $$\frac{F}{5}$$

which indicates that this relay have five contact sets which are respectively indicated F1, F2, F3, F4 and F5 on the drawing.

*Calls from Tributory Office to Tandem Office (local and toll)*

Figure 5:
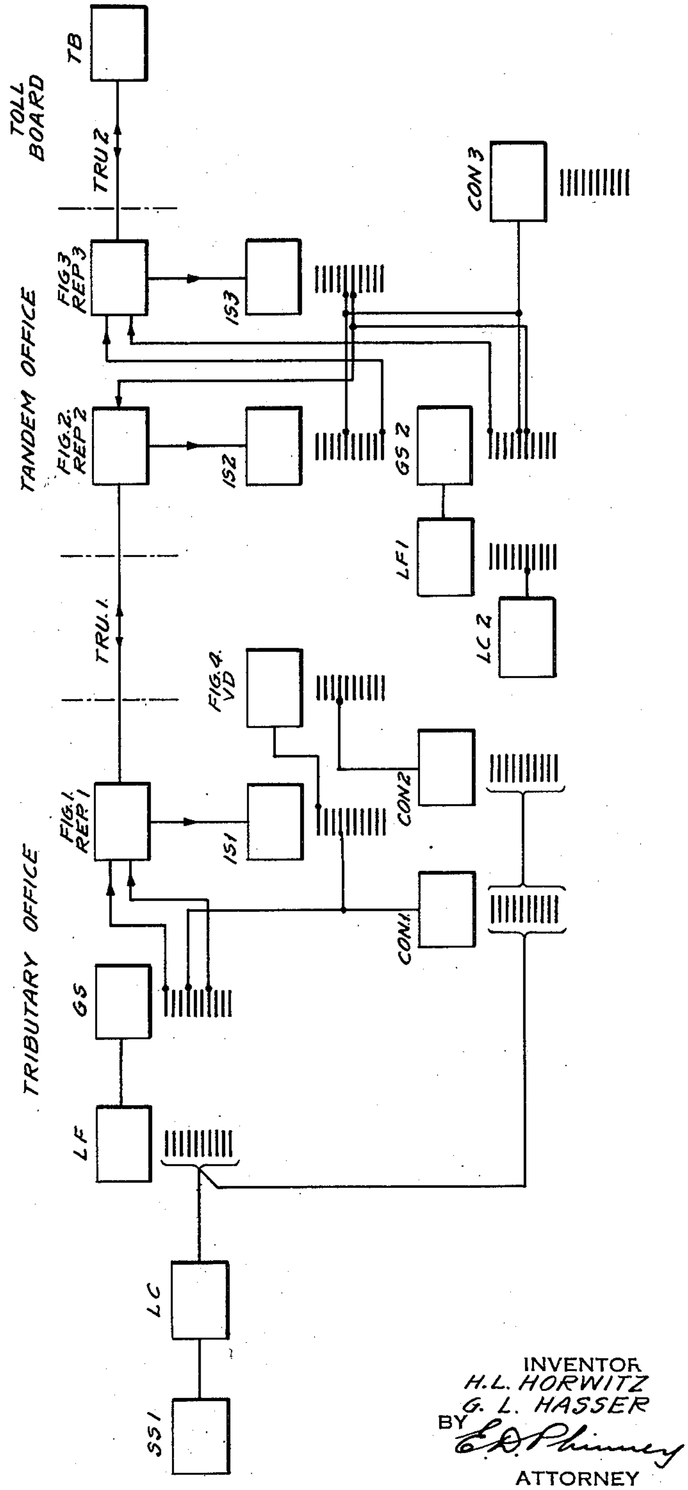
Fig. 5 is a lay-out diagram of a multi-office system showing the interconnection of the repeaters and of the associated switching equipment.

When a calling party of the Tributory Office removes his handset and dials the number of a wanted subscriber in the Tandem Office, or the digit 0 to call the toll operator, the call is extended in known manner over the station line circuit LC, Fig. 5, line finder LF, 1st group selector GS to an idle two-way repeater Rep1 giving access to a trunk Tru1 extending between the Tributory Office and the Tandem Office.

*Call to subscriber in Tandem Office (normal access)*

When the repeater Rep1 is seized by a subscriber making a call to a wanted party in the Tandem Office over the path of normal access +L(1), −L(1), P, Fig. 1, absence of ground on the P lead allows the preceding equipment to seize this circuit and switch through the subscriber's loop, closing the circuit to relay A over the +L(1) and −L(1) leads and through the windings of repeating coil RC. A operates and, in turn operates relay F over contacts A2. F at contacts F1 removes the 600 ohm termination YF from the line and at contacts F4 operates relay B. B at contacts B1 removes ground from the lead ATB in order to meter an all trunk busy condition if all such other grounds have been removed in other repeaters, and closes a circuit to operate slow operating relay M via its 3—4 winding, at contacts B3 places ground on the P lead in order to make this circuit busy to other outgoing calls and to hold the preceding equipment, and at contacts B5 prepares a circuit to relay C. Before relay M can operate, relay D operates over the contacts B1 and B4 of relay B and short circuits the operating winding of relay R. The contacts of relay M have no effect at this time other than releasing relay D at contacts M4.

Since the circuit is arranged for simplex dialing over the trunk, relay A at contacts A1 applies resistance battery over lamp BRA, the winding of relay G and conductor DL to the + and − leads of the trunk, thus causing the succeeding equipment in the distant office to be seized. Relay G operates. Relay H is slow to operate and does not operate should a circuit be closed from ground to H during the operation of relays G and F.

Figure 2:
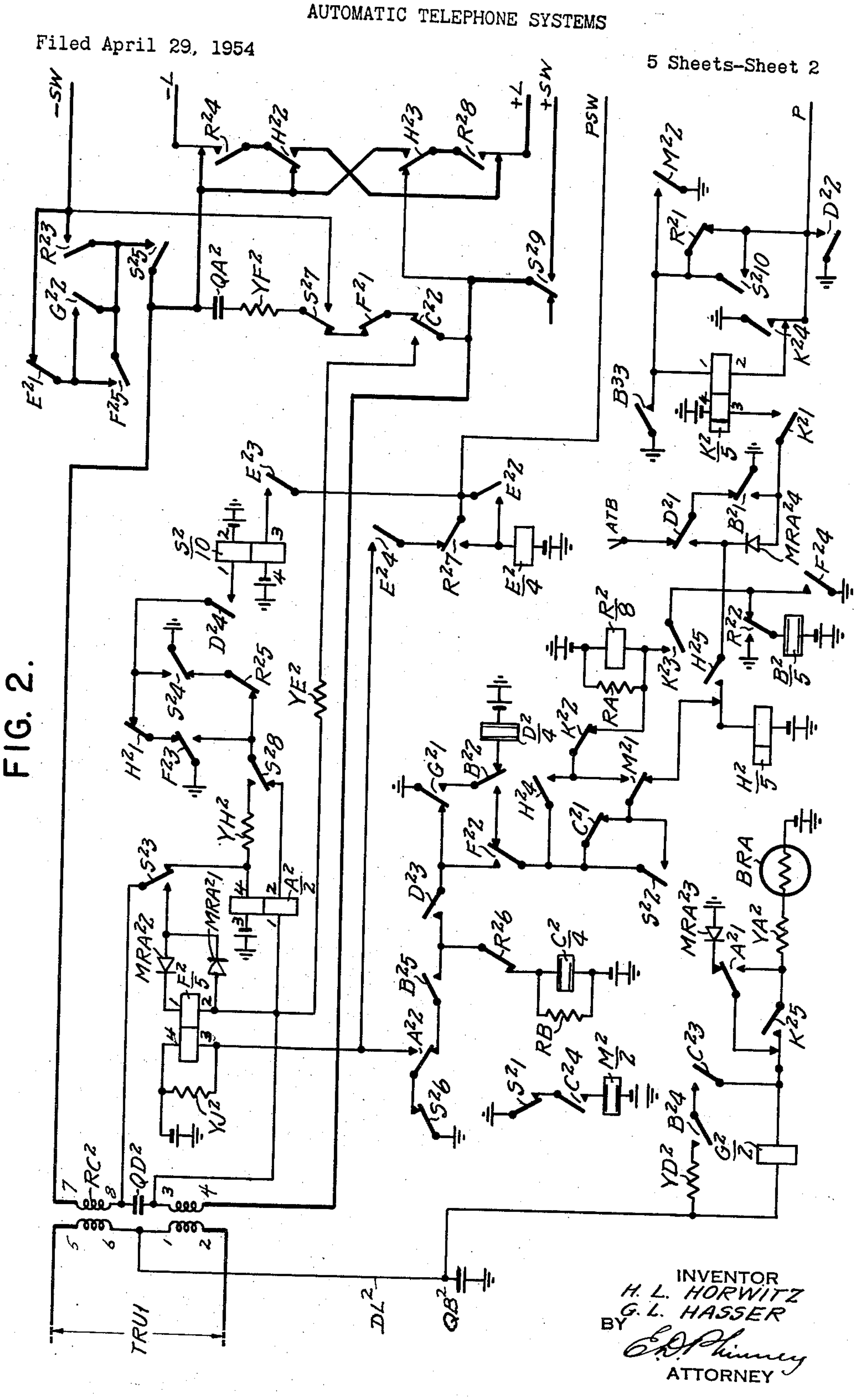
Fig. 2 is a circuit diagram of the two-way auto-to-auto repeater at the tandem office.

In the Tandem Office, resistance battery on the + and − leads of the trunk energizes the relay $G^2$ of the repeater, Fig. 2. The trunk enters Fig. 2 on the left-hand side and the circuit for $G^2$ extends over conductor $DL^2$, winding of $G^2$, contacts $K^25$, $A^21$, and rectifier $MRA^23$ to ground. Relay $G^2$ operates, at contacts $G^22$ completes part of the loop for seizing the succeeding equipment, and at contacts $G^21$ closes a circuit for relay $D^2$. Relay $D^2$ at contacts $D^21$ removes ground from the all trunks busy lead ATB in order to meter an all trunks busy condition, at $D^22$ grounds the P lead to make this circuit busy to outgoing calls, at $D^23$ prepares a circuit for relay $C^2$, and at $D^24$ closes a circuit over $H^21$, $F^23$ for upper winding 1—2 of relay $S^2$, which locks over its contacts $S^24$ and completes the loop for seizing an incoming selector IS2 (see Fig. 5). This loop extends from the lead —SW, Fig. 2, contacts $E^21$, $G^22$, $S^25$, winding 7—8 of repeating coil $RC^2$, contacts $S^23$, rectifier $MRA^21$, winding 3—4 of coil $RC^2$, contacts $S^29$ to the lead +SW.

Relay A, Fig. 1 follows each series of dial pulses received. When at normal, A at contacts A2 opens the circuit to relay F and closes the circuit to relay C. C operates on the first impulses of each series. Relays B and C are slow to release and remain operated during impulsing. Relay C at contacts C1 opens the circuit to relay H to prevent its operation during pulsing, at contacts C2 shuns winding 3—4 of repeater RC with resistor YE and also shunts at contacts C3 the winding of G with resistor YD in order to prevent impulse distortion, and at contacts C2 opens the circuit to the terminating resistor YF to prevent it from being reapplied to the line should relay F restore during pulsing.

When relay A is at normal, it also removes at contacts A1 resistance battery from the DL lead and from the + and — wires of the trunk thereby pulsing over the trunk.

After the last pulse of each series, relay A remains operated, opening the circuit to relay C, and reclosing the circuit to relay F. Relay C restores.

In the tandem office, relay $G^2$, Fig. 2, follows the impulses received, and in its normal position opens at $G^22$ the loop to the incoming selector. Relay $C^2$ operates over $G^21$, $D^23$ and $R^26$ on the first impulse of each series, and at $C^22$ shunts the winding 3—4 of repeating coil $RC^2$ with resistor $YE^2$ to improve impulsing conditions.

After the last impulse of each series, relay $G^2$ remains operated, recloses the loop circuit to the succeeding equipment, releases $C^2$ and recloses the circuit to relay $D^2$. Relays $C^2$ and $D^2$ are slow to release and remain operated during impulsing.

The succeeding local equipment follows the impulses received from $G^2$, establishes a connection to the dialed line, and signals the dialed line, all in well-known manner.

In the repeater of Fig. 2, when a succeeding switch reverses battery over the +SW and —SW leads on the reply of the wanted subscriber relay $F^2$ operates over its 1—2 winding in series with rectifier $MRA^22$. Relay $F^2$ at contacts $F^23$ operates relay $A^2$ over its 3—4 winding, operates relay $B^2$ at contacts $F^24$ and shunts contact $G^22$ at $F^25$ to hold the succeeding equipment operated when relay $G^2$ restores.

Relay $A^2$ at contacts $A^21$ replaces ground with resistance battery over resistor $YA^2$ and lamp $BRA^2$ to winding of $G^2$ and conductor $DL^2$ thus giving an answer supervisory signal to repeater Rep1. Relay $G^2$ releases, opens the circuit to $D^2$, and operates $H^2$ over contacts $G^21$, $F^22$, $C^21$, $M^21$ and $H^25$. Relay $H^2$ locks to ground over $H^25$, $MRA^24$ and $B^21$ and operates relay $R^2$ over $K^22$, $H^24$, $F^22$, $G^21$. Relay $R^2$ closes an additional circuit to relay $B^2$, places an additional short on the pulsing contact of $G^2$ at $R^23$, closes at $R^27$ a circuit to relay $E^2$ from the PSW lead and at $R^26$ opens the circuit to relay $C^2$. Relay $D^2$ is slow to release and does not restore until relay $E^2$ has operated.

Relay $E^2$ operates from ground returned over the PSW lead, at $E^22$ bridges the contact $R^27$ to maintain a circuit to its winding, closes at $E^23$ a holding circuit to relay $S^2$ via its 3—4 winding, opens at $E^21$ a short on the contact $R^23$ in the transmission circuit in preparation for the release and closes at $E^24$ a holding ground to the 3—4 winding of relay $F^2$.

In the Tributory exchange, the replacing of ground on the + and — leads of the trunk with resistance battery causes the relay G, Fig. 1 to restore and relay H is energized over contacts G1. Relay H at contacts H5 locks to ground on the P wire and opens its operating circuit, at contacts H1 opens the circuit to relay C, and at contacts H4 operates relay S. Relay S at contacts S4 closes an additional holding circuit to relay B and at contacts S5, S9 reverses battery towards the calling line to give an answer supervisory signal.

When the calling party disconnects first, the circuit to relay A, Fig. 1, is opened. Relay A restores and releases relay F.

The release of A replaces resistance battery with ground on the DL wire and "+" and "—" leads of the trunk (simplex) over the winding of relay G, thus giving distant disconnect supervision and reoperating relay G. Relay F opens the circuit to relay S but recloses an alternate circuit to S over contacts M3, G1, B2, F2, C1 and H4. Relay S maintains relay B operated. If relay S releases momentarily during the transfer time of its holding circuit, relay B remains operated since it is slow to release.

In the repeater, Fig. 2, at the Tandem Office, relay $G^2$ operates and at contacts $G^21$ opens the circuit of relay $R^2$, which at contacts $R^23$ opens the loop to the succeeding equipment and transfers the holding circuit of relay $B^2$ to contacts $F^24$. When ground is removed from the PSW lead, relays $E^2$, $S^2$ and $F^2$ release. A circuit is now closed over contacts $S^26$, $A^22$, $B^25$, $R^26$ for relay $C^2$, which operates relay $M^2$ over $C^24$. At contacts $M^22$ relay $M^2$ grounds the P lead to hold the circuit busy. The release of relay $F^2$ opens the circuit of relay $B^2$ which at $B^25$ opens the circuit of relay $C^2$, which in turn at $C^24$ releases relay $M^2$. Relay $M^2$ now removes ground from the P lead rendering the circuit idle for succeeding calls.

When the repeater Rep1 is seized by a subscriber switch in known manner reverses battery over the —SW and +SW leads, release relay $F^2$, Fig. 2. Relay $F^2$ opens at $F^23$ the circuit of relay $A^2$, which in turn at contacts $A^21$ connects ground via winding of relay $G^2$ to the $DL^2$ lead. Relay $G^2$ energizes and holds relay $R^2$ over $G^21$.

In Fig. 1 when the resistance battery over the DL lead is replaced by ground, relay G operates and releases S as before.

Relay S at contacts S5 and S9 reverses battery to the calling party in order to give disconnect supervision.

When the calling party disconnects, relay A is released and, in turn, releases relay F.

Relay A replaces resistance battery with resistance ground on the conductor DL and the "+" and "—" leads of the trunk (simplex) over the winding of G, thus allowing the succeeding equipment to release and releasing G. Relays B, H and M restore. Ground is removed from the "P" lead, allowing the preceding switches to restore, and this circuit is ready for the next call.

In the repeater, Fig. 2, at the Tandem Office, when the DL lead is grounded at the Tributory Office, relay $G^2$ releases and opens the circuit to relay $R^2$. Relay $F^2$ operates and relay $R^2$ restores and opens the loop to the succeeding equipment. When ground is removed from the PSW lead, the relays $E^2$, $S^2$ and $F^2$ restore and the circuit of Fig. 2 is released as already described.

*Call to toll operator (pulse sending access)*

When the repeater Rep1 is seized by a subscriber making a call to the toll operator via the Tandem Office, over the alternative path of access (10th level of selector GS, Fig. 5) comprising the leads +L(2), —L(2), and P, Fig. 1, relays A, F, B, M and D operate as before.

Relay D at contacts D6 places a multiple short circuit across the 1—2 winding of relay R which is connected in series with the —L(2) lead. The remaining contacts of D are not effective at this time. Relay M operates, at contacts M1 opens part of the circuit to the DL lead, at contacts M2 opens one of two shorts across the 1—2 winding of relay R, at contacts M5 grounds the "P" lead to short circuit the 1—4 winding of the tone coil TC, at contacts M4 short circuits its 1—2 winding and opens the circuit to relay D. Relay D releases slowly, due to copper sleeve on its core, to provide time for the distant equipment to be seized. Relay D, on release, at contacts D6 removes the remaining short across the 1—2 winding of relay R. Relay R now operates in series with relay A over the calling subscriber's loop. Relay R closes a circuit to its 3—4 winding at a preliminary make contact R5. When the 3—4 winding of R is energized, the relay operates all its contacts. Relay R now opens at contact R1 the circuit to relay M, at contacts R2 opens the loop to the normal access, at contacts R3 short circuits the S6 contact to prevent its effect on answer, at contacts R4 opens the circuit to its 1—2 winding without opening the loop, at contacts R6 removes ground from the circuit controlling the operation of relay H and connects ground to the ring start lead RST to start or continue the operation of the ringing equipment, and at contacts R7 opens the battery connection to the DL lead to start a dial pulse. The relay M is designed to release in a time equivalent to a dial pulse. This time may be adjusted by changing the value of the shunt resistance YS. When relay M releases, the battery connection to the DL lead is restored at contacts M1 and the equipment in the distant office has thus received a single inserted pulse. Relay M also at contacts M3 connects ground to the contact G1 controlling the answer supervisory circuit, replaces at contacts M2 the multiple short across the 1—2 winding of relay R, at contacts M4 removes the short from across its own 1—2 winding, and at contacts M5 removes the short from across the 1—4 winding of the tone coil TC to prepare for transmitting pay station tone to an operator on answer. The circuit now waits answer by the called party.

Ground on the DL lead over the winding of relay G caused the seizure of the repeater, Fig. 2, at the Tandem Office, as described in connection with seizure over the normal path of access. Relay $G^2$ responds to the additional inserted impulse and the incoming selector IS2, Fig. 5, is stepped to its first level in which it hunts for an idle auto-to-manual repeater Rep3, the circuit of which is shown in detail in Fig. 3.

Absence of ground on the P lead allows the incoming selector to switch through, closing the circuit to relay $A^3$ over the $+L(2)$ and $-L(2)$ leads through line loop and through the windings of the repeating coil $RC^3$.

Relay $A^3$ now operates, at contacts $A^31$ removes ground through the winding of relay $G^3$ from the $DL^3$ lead, at $A^34$ connects a multiple ground to its 1—2 winding, and at $A^32$ and $A^33$ closes the circuits to relay $M^3$ and $B^3$. Relay $B^3$ operates, at $B^31$ removes a ground from the lead ATB to provide for metering an all trunks busy condition and closes the circuit to the 3—4 winding of relay $C^3$, and places ground on the ring start lead RST in order to start or continue the operation of the associated ringing equipment, at $B^32$ opens part of a circuit to relay $D^3$ to prevent its operation on an outgoing call and closes part of an alternate circuit to relay $M^3$, at $B^33$ applies resistance battery over the winding of relay $G^3$ to the $DL^3$ lead, thus causing the operator in the distant office to be signalled, at $B^34$ places ground on the P lead through the 1—4 winding of the TC tone coil in order to make this circuit busy to other outgoing calls and to hold the preceding equipment operated, and at $B^35$ closes the circuit to relay $K^3$ in parallel with condenser $QA^3$ and resistance $G^3$, thus allowing condenser $QA^3$ to become charged. Relay $G^3$ operates, at $G^31$ opens the circuit to relay $M^3$ and closes part of the alternate circuit to $M^3$. Relay $M^3$ is slow to operate and does not operate during the operate time of relay $G^3$. Relay $K^3$ operates and at $K^31$ connects ringback tone over lead RBT to the $-L(2)$ lead through condenser $QD^3$ to advise the dialing party that the operator is being signalled. Relay $C^3$ operates, at $C^32$ prepares the peg count circuit PC, and at $C^31$ removes the 600 ohm termination $YD^3$ from the line.

When the call is answered by the operator, ground is replaced on the $DL^3$ lead with resistance battery, thus opening the circuit to relay $G^3$. $G^3$ restores and closes the circuit to relay $M^3$ at $G^31$.

Relay $M^3$, on operating, at contacts $M^31$ disconnects the ringback tone and closes the circuit for extending post pay station tone over the P lead and winding 2—3 of coil TC through condenser $QG^3$ to the operator, at $M^32$ opens the circuit to relay $K^3$, and closes a locking circuit to relay $B^3$, at $M^34$ removes ground from the RST lead to allow the associated ringback equipment to restore, at $M^35$ removes a multiple ground from the 1—2 winding of relay $A^3$ and at $M^33$ and $M^37$ reverses the polarity of the calling line via the $+L(2)$ and $-L(2)$ leads, to provide answer supervision to the preceding equipment as previously described in connection with a call completed over normal access. This signal is necessary only when the call to this repeater has been originated over a trunk from another office. When the circuit to relay $K^3$ is opened, condenser $QA^3$ discharges through resistance $YG^3$ and the winding of relay $K^3$, thus delaying the release of relay $K^3$. Relay $K^3$, upon restoring, at $K^31$ opens the circuit for furnishing the operator with a splash of post pay station tone if the call originated from a pay station. Tone coil $TC^3$ is of sufficient impedance to prevent shunting the post pay station tone current to ground.

In the repeater of Fig. 2 when a succeeding switch reverses battery over the $-SW$ and $+SW$ leads when the call is answered, relay $F^2$ operates over its 1—2 winding in series with rectifier $MRA^22$. Relay $F^2$ at contacts $F^23$ operates relay $A^2$ over its 3—4 winding, operates at contacts $F^24$ relay $B^2$, and shunts contacts $G^22$ at $F^25$ to hold the succeeding equipment operated when relay $G^2$ restores.

Relay $A^2$ replaces ground with resistance battery over resistor $YA^2$ and lamp $BRA^2$ to the winding of relay $G^2$, thus giving answer supervision to the distant party. Relay $G^2$ releases, opens the circuit to relay $D^2$, and operates relay $H^2$ over $G^21$, $F^22$, $C^21$, $M^21$ and $H^25$. Relay $H^2$ locks to ground over $H^25$, $MRA^24$ and $B^21$ and operates relay $R^2$ over $K^22$, $H^24$, $F^22$, $G^21$. Relay $R^2$ closes an additional circuit to $B^2$, places an additional short on the pulsing contact of $G^22$ of relay $G^2$ at $R^23$, closes at $R^27$ a circuit to relay $E^2$ from the P *sw* lead and opens the circuit to relay $C^2$. Relay $D^2$ is slow to release and does not restore until relay $E^2$ is operated.

Relay $E^2$ operates from ground returned over the P *sw* lead, at $E^22$ bridges the contact $R^27$ to maintain a circuit to its winding, closes at $E^23$ a holding circuit to relay $S^2$ via its 3—4 winding, opens at $E^21$ a short on the $R^23$ contact in the transmission circuit in preparation for the release and closes at $E^24$ a holding ground to the 3—4 winding of relay $F^2$.

When the succeeding equipment replaces ground on the $DL^2$ lead with resistance battery, relay G, Fig. 1, restores. Relay G closes a circuit for relay H at contacts G1.

Relay H at contacts H5 locks to ground on the P wire and opens its operate circuit, at contacts H1 opens the circuit to relay C, and at contacts H4 operates relay S. Relay S at contacts S4 closes an additional holding circuit to relay B, closes at contacts S7 a circuit for the transmission of paystation tone received via the P lead and the 2—3 winding of the tone coil TC and extended via a make contact J1 of relay J and condenser QF to the $-L(2)$ lead. This tone is connected to the P lead only on paystation lines and is utilized to inform the operator that the call is originated on a paystation. Relay S at contacts S1 opens the circuit to relay J which was energized in parallel with relay M by a make contact B1 of B, and at contacts S2 opens the ground to the RST lead. Relay J is paralleled by a 1000 ohm resistor YM and a 40 MF condenser QE which discharges through the winding of relay J when its energizing circuit is opened by relay S. Relay J, therefore, is made slow-to-release thus providing a time interval in which the paystation tone is transmitted to the operator.

The paystation tone is not transmitted when the call is originated via the normal access as relay R is not operated and hence relay M remains operated. Relay M when operated short circuits the tone forwarded over the P lead by grounding terminal 1 of the tone coil TC at contacts M5.

Answer supervision is not returned on a connection via the pulse sending access.

Transmitter battery is supplied to the calling party through the windings of relay A. The windings of repeat coil RC and condenser QD complete the transmission circuit.

When the calling party disconnects first, the circuit to relay A, Fig. 1, is opened. A restores and releases relay F.

The release of A replaces resistance battery with ground on the DL wire and "+" and "−" leads of the trunk (simplex) over the winding of relay G, thus giving distant disconnect supervision and reoperating relay G. Relay F opens the original circuit to relay S but recloses an alternate circuit over contacts M3, G1, B2, F2, C1 and H4 which maintains relay B operated. If relay S releases momentarily during the transfer time of its holding circuit, relay B remains operated since it is slow to release.

When resistance battery is replaced by ground on $DL^2$, relay $G^2$ operates and opens the circuit to relay $R^2$ which opens the loop to the succeeding equipment and transfers the holding circuit for relay $B^2$ to a ground controlled by relay $F^2$. Since the connection is to a toll operator, the ground returned on the PSW lead will maintain the connection, and release will not take place until the toll operator disconnects.

Figure 3:
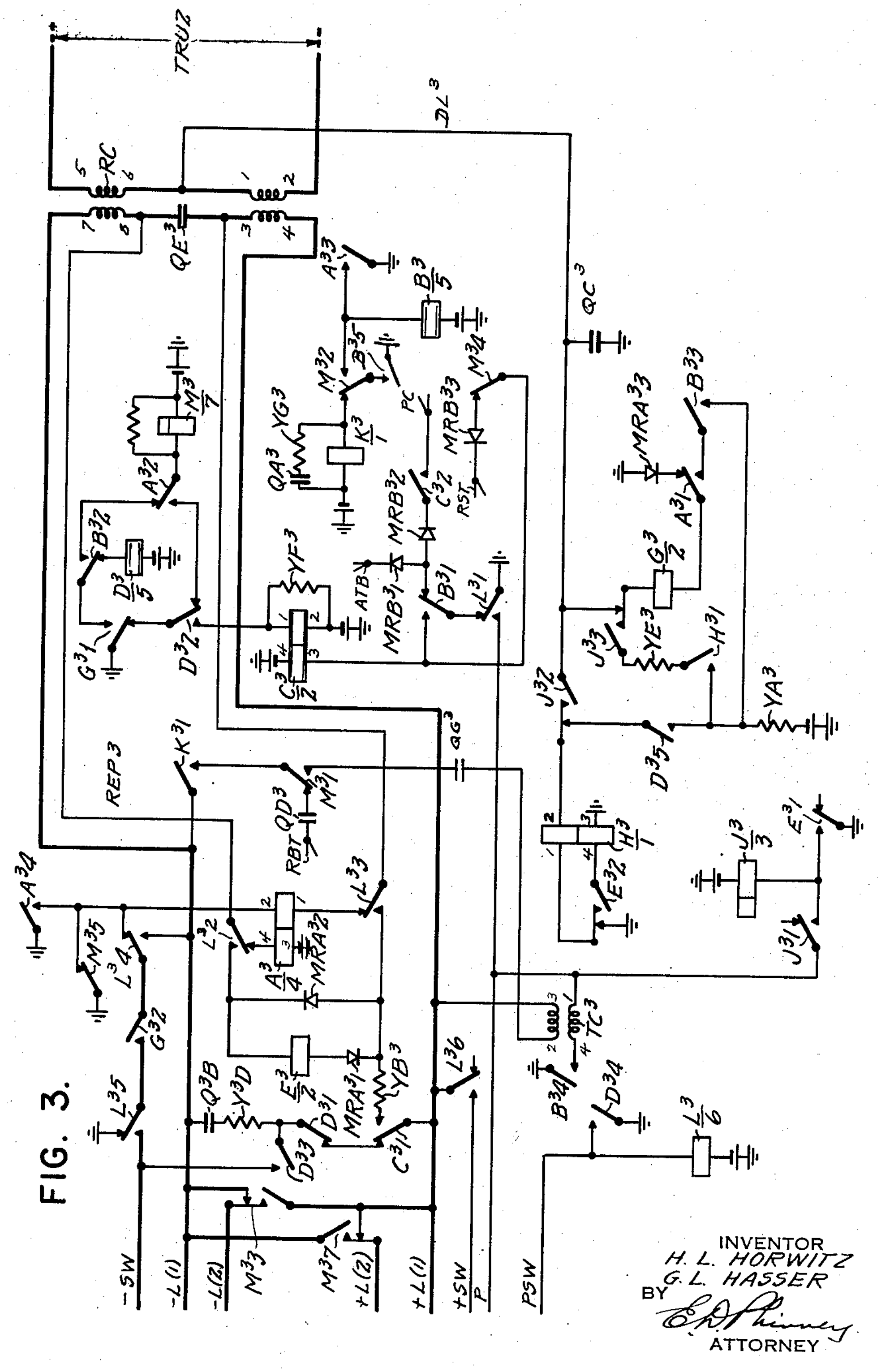
Fig. 3 is a circuit diagram of the two-way auto-to-manual repeater at the tandem office.

When the loop to the repeater, Fig. 3 is opened, relay $A^3$ restores. The connection is held, however, by ground on the P lead over $B^34$ and winding 1—4 of $TC^3$.

Relay $A^3$ upon restoring, at $A^31$ replaces resistance battery on the $DL^3$ lead through the winding of relay $G^3$, with ground, thus closing the circuit to relay $G^3$ and giving the operator in the distant office disconnect supervision. Relay $A^3$ also opens at $A^32$ the circuit to relay M3 and prepares an alternate circuit $M^3$, and at $A^33$ opens a multiple circuit to relay $B^3$. Relay $G^3$ operates, closes at $G^31$ the alternate circuit to $M^3$, and connects ground via the contacts $L^35$, $G^32$ and $L^34$ to the 1—2 winding of $A^3$ to provide for the reoperation of relay $A^3$ if the operator does not disconnect and the subscriber recloses the loop. Relay $M^3$ is inherently slow to release and remains operated for the operate time of relay $G^3$ and transfer time of relay $A^3$. When the operator in the distant office disconnects, resistance battery on the $DL^3$ lead is replaced by ground, thus opening the circuit to relay $G^3$. Relay $G^3$ restores and opens the circuits to relays $M^3$ and $A^3$. Relay $B^3$ restores and at $B^34$ removes ground from the P lead to allow the preceding equipment to restore and remove ground from the PSW lead. When ground is removed from the P SW lead, relays $E^2$, $S^2$ and $F^2$ release. When relays $S^2$ and $F^2$ release, a circuit is closed to relay $C^2$ which, in turn, operates relay $M^2$. Relay $M^2$ grounds the P lead to maintain the circuit. When relay $B^2$ restores due to relay $F^2$ releasing it opens the circuit to relay $C^2$ which releases and, in turn, releases relay $M^2$. Relay $M^2$ restores and at $M^22$ removes ground from the P lead thus making the circuit idle for succeeding calls.

In the repeater of Fig. 1, relay G releases and in turn releases relays B, H and R. Ground is removed from the P lead, allowing the preceding switches to release and freeing the repeater of Fig. 1.

If the operator disconnects first, resistance battery on the $DL^3$ lead is replaced by ground, thus closing the circuit to relay $G^3$ which opens the circuit of relay $M^3$. The P lead is held grounded at contacts $B^34$, however, and holds the preceding equipment. Relay $M^3$ reverses the battery over the leads +L2, −L2, and upon battery reversal over leads +SW, −SW, relays $F^2$, $A^2$, Fig. 2, release and ground is placed to winding of relay $G^2$ which operates together with relay G of Fig. 1. When the calling party hangs up, relays A, F, Fig. 1, release. In Fig. 1, when the resistance battery over the DL lead is replaced by ground, relay G operates and releases relay S, as before.

Relay S reverses battery to the calling party in order to give disconnect supervision.

When the calling party disconnects, relay A is released and, in turn, releases relay F.

Relay A replaces resistance battery with resistance ground on the DL lead and the "+" and "−" leads of the trunk (simplex) over the winding of relay G, thus allowing the succeeding equipment to release and releasing relay G. Relays B, H and M restore. Ground is removed from the P lead, allowing the preceding switches to restore, and this circuit is ready for the next call.

In the repeater of Fig. 2 relay $G^2$ releases and opens the circuit to relay $R^2$. Relay $R^2$ restores, opens the loop to the succeeding equipment and transfers the holding ground for relay $B^2$ to make a contact $F^24$ of $F^2$. Relay $F^2$ operates and closes the holding circuit to relay $B^2$.

Relay $R^2$, Fig. 2, opens the loop to relay $A^3$, Fig. 3, which grounds the winding of $G^3$, freeing the repeater of Fig. 3 as already described. When ground is removed from the P lead, the incoming selector restores and removes ground from the PSW lead thereby freeing the repeater of Fig. 2.

*Call from subscriber in Tandem Office to subscriber in Tributory Office*

The connection is extended in well-known manner from the subscriber line circuit LC2, Fig. 5, over line finder LF1 and group selector GS2 (fifth level) to an idle repeater Rep2.

Referring to the circuit of repeater Rep2 shown in detail in Fig. 2, absence of ground on the P lead allows the preceding equipment to seize this circuit and switch through the calling loop, closing the circuit of relay $A^2$ over the +L and −L leads and through the windings of repeating coil $RC^2$. Relay $A^2$ operates and in turn operates relay $F^2$ over its winding 3, 4 and contacts $A^22$. Relay $F^2$ removes the 600 ohm termination $YF^2$ from the line at contacts $F^21$, closes a circuit via $G^21$, $F^22$, $C^21$, $M^21$, $H^25$ to relay $H^2$, connects at $F^23$ a multiple ground to the 1—2 winding of relay $A^2$, and operates relay $B^2$ via $F^24$, $R^22$. Relay $B^2$ removes ground from the all trunks busy metering circuit ATB at $B^21$ and prepares the locking circuits for relays $H^2$ and $K^2$, at $B^22$ opens the circuit to relay $D^2$ to prevent its operation on an outgoing call and prepares an alternate circuit to relay $H^2$, at $B^23$ grounds the P lead, at $B^24$ prepares a short circuit for relay $G^2$ during dialing, and at $B^25$ prepares a circuit to relay $C^2$.

Relay $A^2$ at $A^21$ applies resistance battery over the winding of relay $G^2$ to the DL2 lead and the "+" and "−" leads of the trunk (simplex), thus causing the succeeding equipment in the distant Tributory Office to be seized. Relay $G^2$ operates. Relay $H^2$ is slow to operate and does not operate should a circuit be closed from ground at $G^21$ during the operation of relays $G^2$ and $F^2$.

In the Tributory Office repeater Rep1, Fig. 1, relay G operates, closing a circuit to relay D. Relay D at contacts D1 opens a circuit utilized on outgoing calls to shunt the impedance of the relay G, at D2 opens a short across the thermistor TH to provide a slow operate time for the relay H, places at contacts D3 ground on the P SW lead in order to provide a ground marking for succeeding equipment when required, closes at D4 a circuit to relay U, grounds at D5 the P lead to make this circuit busy to outgoing calls and at D6 short circuits the 1—2 winding of relay R. Relay U locks over U7, completes at U8, U10 and U11 a loop via the relay F from the +SW and −SW leads to seize the succeeding equipment, prepares at $U^3$ a circuit to relay A, opens at U9 the termination across the + and − leads and connects a spark quenching circuit comprising condenser QB and resistor YF across the impulsing contact L1, at U6 prepares a locking circuit to relay D, prepares a circuit to the impulse correcting relays, at U4 shunts the contact C1 in preparation for answer supervision, at contact U2 opens the connection to the ATB lead and at U1 removes ground from the circuit controlling the locking of relay F.

Relay F does not operate at this time due to the polarity of the loop and the shunting effect of rectifier MRA1. The circuit is now ready to receive dial impulses.

Referring to Fig. 2, relay $A^2$ follows each series of dial pulses received. When at normal, relay $A^2$ opens at $A^2 2$ the circuit to relay $F^2$ and closes the circuit to relay $C^2$. Relay $C^2$ operates on the first impulse of each series. Relays $B^2$ and $C^2$ are slow to release and remain operated during impulsing. Relay $C^2$ opens at $C^2 1$ the circuit to relay $H^2$ to prevent its operation during pulsing, shunts at $C^2 2$ winding 3—4 of repeating coil $RC^2$ with resistor $YE^2$, and at $C^2 3$ shunts the winding of relay $G^2$ with resistor $YD^2$ in order to prevent impulse distortion, opens also at $C^2 2$ the circuit to the terminating resistor $YF^2$ to prevent it being reapplied to the line should relay $F^2$ restore during pulsing, and closes at $C^2 4$ a circuit to relay $M^2$. Relay $M^2$ operates to prepare at $M^2 1$ a circuit to relay $R^2$ for reception of a preliminary answer supervisory signal under circumstances which will be referred to later.

When relay $A^2$ is at normal, it removes at contacts $A^2 1$ resistance battery from the DL2 lead and from the "+" and "−" wires of the trunk.

After the last pulse of each series, relay $A^2$ remains operated, opening the circuit to relay $C^2$, and reclosing the circuit to relay $F^2$. Relay $C^2$ restores.

Referring now to Fig. 1, the removal of battery from the DL lead deenergizes relay G and when G closes its break contact $G^1$ on release, it energizes relay L via its 3—4 winding and a break contact $T^2$ of relay T. Relay L operates, at L4 closes a circuit to the 3—4 winding of relay T and closes a locking circuit to its 3—4 winding via MRA4 to hold on short pulses, at L2 closes a holding circuit to relay D to prevent its release on a long pulse, at L3 short circuits its primary winding to provide a delay in its release and at L1 opens the loop to the incoming selector IS1 (see Fig. 5). Relay T operates slowly to provide pulse time, at T2 opens the circuit to relay L, at T1 opens a short on its primary winding to provide the relay with a faster release time, at T3 closes a circuit to relay C, and at T2 locks to the pulse delivered by relay G to prevent sending more than one impulse for a long impulse received.

Relay C operates, at C2 connects a 100 ohm resistor YE across one winding 3—4 of the repeating coil RC to shunt its impedance to improve the impulsing to the succeeding equipment and at C4 short circuits at 250 ohm resistor YL in the shunt on the 1—2 winding of relay T to increase its operate time for succeeding pulses.

Relay L releases slowly due to the short on its 1—2 winding after relay T opened the circuit to its 3—4 winding. Relay L, on release, closes at L1 the loop to the succeeding equipment, opens the original energizing circuit to relay T, opens the holding circuit to relay D and opens the short on its 1—2 winding. Relay T releases at this time or holds to the impulse if it is still present. When relay G operates at the end of the impulses, the circuit to relay T is opened. Relay T, on release, prepares a circuit to relay L from the impulsing circuit, short circuits its 1—2 winding and opens the circuit to relay C. Relay C is slow to release and remains operated throughout the digit.

Relay L reoperates on the next impulse and the cycle described previously is repeated with the exception that relay C is operated. After the last impulse of each series, relay G remains operated, holding the circuit to relays L and T open and D operated. Relay L in its released condition holds the loop to the succeeding equipment closed.

When the call is answered, a succeeding switch reverses battery over the −SW and +SW leads, allowing relay F to operate over its 1—2 winding in series with rectifier MRA2. Relay F at F3 operates relay A over its 3—4 winding, at F4 operates relay B and at F5 shunts contacts L1 to hold the succeeding equipment operated when relay G (which pulses relay L) restores. Relay A at A1 replaces ground with resistance battery to the winding of relay G. Relay G releases, opens at G1 the circuit to relay D, and operates relay H. Relay H locks over H5 to ground on the P wire, opens at H2 the circuit to the impulse correcting relays, and at H4 operates relay S. Relay S closes at S4 an additional circuit to relay B, at S8 places an additional short on the pulsing contacts L1 of relay L and at S3 recloses the circuit to relay D. Relay D is slow to release and has a holding circuit via H3 to prevent its release during the long operate time of relay H. The spark suppressor SQA protects contacts F3 of relay F.

The windings of repeat coil RC and condenser QD complete the transmission circuit.

In the repeater, in Fig. 2, in the Tandem Office, when ground on the DL2 lead is replaced with resistance battery, relay $G^2$ restores. Relay $G^2$ operates relay $H^2$ over $G^2 1$, $F^2 2$, $C^2 1$, $M^2 1$.

Relay $H^2$ locks to ground $B^2 1$ provided by $B^2$, at $H^2 1$ opens part of the energizing circuit of relay $S^2$, operates relay $R^2$ at $H^2 4$, and at $H^2 2$ and $H^2 3$ prepares circuits to contacts of relay $R^2$ to provide for the reverse battery supervisory signal. Relay $R^2$ opens at $R^2 2$ a holding circuit to relay $B^2$, opens at $R^2 6$ part of a circuit to relay $C^2$ and at $R^2 4$ and $R^2 8$ reverses battery to the calling party in order to give answer supervision. Relay $R^2$ also at $R^2 1$ removes a short circuit from winding 1—2 of relay $K^2$ which operates over the P wire. Relay $K^2$ locks to $B^2 1$ over its winding 3—4 at $K^2 3$ places relay $R^2$ under control of relay $F^2$ at contacts $F^2 4$, and at $K^2 5$ disables contact $A^2 1$ in the circuit of relay $G^2$.

Transmitter battery is supplied to the calling party through the windings of relay $A^2$. The windings of repeat coil $RC^2$ and condenser $QD^2$ complete the transmission circuit.

When the calling party disconnects first, the circuit to relay $A^2$ is opened. Relay $A^2$ restores and at $A^2 2$ released relay $F^2$. The contact $A^2 1$ is not effective due to the operation of relay $K^2$. Relay $F^2$ opens at $F^2 4$ the circuit of relay $R^2$, at $F^2 3$ removes ground from the 1—2 winding of relay $A^2$ and at $F^2 1$ reconnects the termination of the + and − leads. Relay $R^2$ restores, at $R^2 4$ and $R^2 8$ removes the answer supervisory signal, at $R^2 5$ reconnects ground to the 1—2 winding of relay $A^2$ after the line reversal is completed, at $R^2 6$ recloses part of a circuit of relay $C^2$ and at $R^2 2$ opens the circuit to relay $B^2$. Relay $B^2$ releases, at $B^2 1$ opens the circuit to relays $K^2$ and $H^2$, at $B^2 3$ removes a multiple ground from the P lead, at $B^2 2$ prepares a circuit to relay $D^2$, at $B^2 4$ opens part of a short circuit across the relay $G^2$ and at $R^2 6$ opens the circuit to relay $C^2$.

Relay $K^2$ releases and at $K^2 5$ connects ground via $A^2 1$ to the $DL^2$ lead via the winding of relay $G^2$ to provide disconnect supervision to the distant office. Relay $G^2$ operates and closes the circuit to relay $D^2$. Relay $D^2$ operates, connects at $D^2 2$ ground to the P lead to maintain the circuit busy and closes at $D^2 1$ a circuit to hold relay $H^2$ which has not released due to its slow release characteristics. $H^2$ holds the circuit to relay $S^2$ open at $H^2 1$ to prevent its operation and the seizure of the incoming selector.

In the repeater, Fig. 1, at the Tributory Office, when resistance battery on the DL lead is replaced with ground, relay G operates. Relay G releases relay S. Relay S releases relay D which, in turn, releases relay U and relay A. Relay U opens the loop to the succeeding equipment. Relay F restores and, in turn, relays B and H release. Relay A replaces resistance battery with ground to the winding of relay G, thus releasing relay G. This circuit is then ready for the next call.

In the repeater, Fig. 2, relay $G^2$ releases opening the circuit to relay $D^2$. Relay $D^2$ restores and releases relay $H^2$. Relay $C^2$ now operates and energizes relay $M^2$ which in turn maintains the repeater busy at contacts $M^22$. Relay $C^2$ restores when relay $D^2$ releases and opens the circuit to relay $M^2$ which removes the ground from the P lead. The repeater is now idle and ready for a new call.

Referring to the repeater, Fig. 1, at the Tributory Office, when the called party disconnects first, battery reversal over the −SW and +SW leads, causes relay F to restore.

Relay F opens the circuit to relay S and a multiple circuit to relay B, prepares an alternate circuit to relay S, and releases relay A. Relay A replaces resistance battery with ground to the winding of relay G, thus sending a disconnect supervisory signal towards the calling line. Relay G operates and recloses the circuit to relay S. If relay S should momentarily release during the transfer of its holding circuit, relay B will remain operated since it is slow to release. When the calling party releases, the preceding equipment replaces resistance battery with ground on the DL lead. Relay G releases and, in turn, relays S, B, D, U and H are released. Ground is removed from the P lead and this circuit is ready for the next call.

Referring to Fig. 2, when resistance battery is replaced by ground over the $DL^2$ lead, relay $G^2$ operates. No further action takes place until the calling subscriber releases.

When the calling subscriber releases, relay $A^2$ restores opening the circuit to relay $F^2$. Relay $F^2$ releases, reconnects the termination to the + and − leads, opens the circuit to relay $R^2$, removes ground from the 1—2 winding of relay $A^2$ and closes part of a circuit to relay $S^2$. Relay $R^2$ releases, opens the circuit to relay $B^2$, reverses the polarity of the line, reconnects ground to the 1—2 winding of relay $A^2$ and closes a circuit to relay $C^2$. Relay $C^2$ closes a circuit to relay $M^2$ and short circuits relay $G^2$. $G^2$ releases. Relay $B^2$ releases, opens the holding circuits to relays $H^2$ and $K^2$, prepares a circuit to relay $D^2$, removes a multiple ground from the P lead, opens the circuit to relay $C^2$ and opens the short across the winding of relay $G^2$.

Relay $G^2$ reoperates, closes a circuit to relay $D^2$ until relay $K^2$ releases and opens its circuit at $K^25$. Relay $G^2$ restores, closes a circuit to relay $C^2$ which closes a circuit to relay $M^2$. Relay $M^2$ in turn grounds the P lead to maintain the circuit busy. Relay $G^2$ also opens the circuit to relay $D^2$ which releases after a relay due to its slow release characteristics and opens the circuit to relay $C^2$. Relay $C^2$ restores, opens the circuit to relay $M^2$. Relay $M^2$ releases and removes ground from the P lead making the circuit available for other calls. The repeater in the distant office is released after relay $K^2$ removes battery from the $DL^2$ lead, and has the release time of relays $D^2$, $C^2$ and $M^2$ in which to restore.

Figure 4:
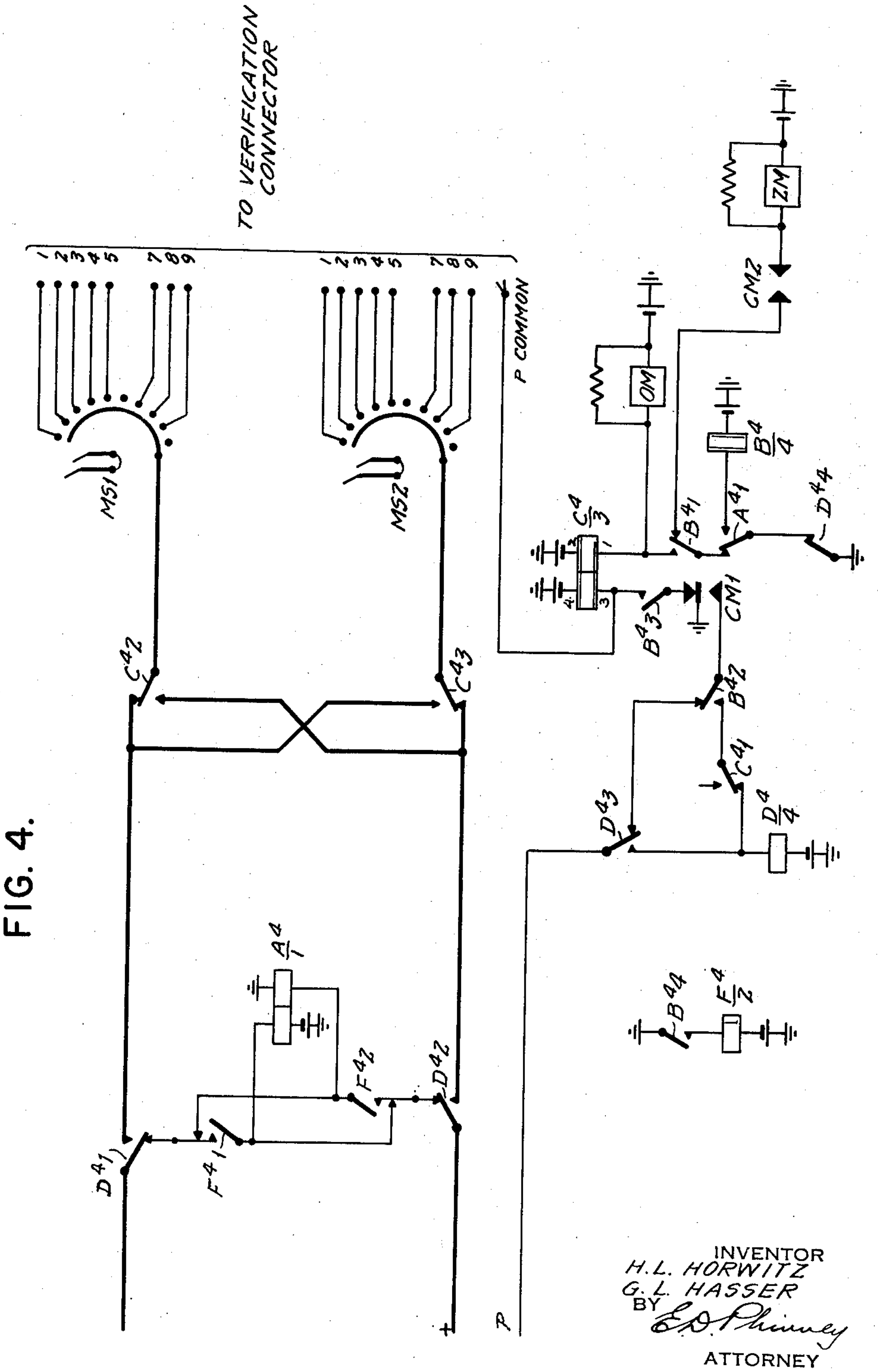
Fig. 4 is a circuit diagram of a verification distributor.

Referring to Fig. 5, if a local subscriber in the Tandem Office dials a second digit (for example 0) corresponding to the level of the group selector, IS1 in the Tributory Office which is assigned for toll access only, theincoming selector IS1 will be stepped to its tenth level in which it hunts for an idle Verification Distributor VD, the detailed circuit of which is shown in Fig. 4 to which reference should now be made.

An absence of ground on the P lead makes this switch idle to hunting incoming selectors.

When a selector stops on the terminals assigned to the switch, it connects ground to the P lead to make it busy to other hunting selectors and connects a loop to the "+" and "−" leads in known manner. Relay $A^4$ operates via the loop and at $A^41$ closes a circuit to relay $B^4$. Relay $B^4$ operates, at $B^41$ prepares an impulsing circuit to the minor switch magnet OM and the 1—2 winding of relay $C^4$ in parallel and opens part of the circuit to the release magnet ZM, at $B^43$ closes a circuit to the pre-energizing winding (3—4) of relay $C^4$ via the minor switch off normal springs CM1, at $B^42$ prepares a circuit for the operation of relay $D^4$ and at $B^44$ closes a circuit to relay $F^4$. Relay $C^4$ operates, opening at $C^41$ part of a circuit to relay $D^4$. The remaining contacts of relay $C^4$ are not effective at this time.

Relay $F^4$ operates slowly due to the copper slug on its core. Relay $F^4$, when operated, at $F^41$ and $F^42$ restores the polarity of the loop to normal. A reverse battery preliminary supervisory signal, therefore, is sent to the preceding equipment until relay $F^4$ operates.

In the repeater, Fig. 1, upon the reversal of battery over the −SW and +SW leads, relay F will operate over winding 1—2 and rectifier MRA2 and, in turn, will operate relay A. Relay A replaces ground on the DL lead with resistance battery to repeat the signal to the Tandem Office. At the same time, a circuit will be closed over F2 to relay H. Relay H will not operate immediately due to the long delay provided by the thermistor TH. When the reverse battery signal is removed in approximately 100 milliseconds, relay F releases and, in turn, releases relay A. Relay A removes the signal from the distant equipment and prepares for the next digit. Relay F, on release, opens the circuit to relay H. Relay D is held during this interval via the rectifier MRB, and contacts U6, B4 and H3.

In the Tandem Office repeater, Fig. 2, the replacement of ground by battery over the DL2 lead causes relay $G^2$ to release. Relay $G^2$ closes a circuit to relay $R^2$ during the release time of relay $M^2$ via $G^21$, $F^22$, $C^21$, $M^21$, $K^22$. Relay $M^2$ is operated by the relay $C^2$ during dialing and releases after the release of $C^2$ after each digit. Relay $M^2$ is slow to release to provide an interval for the operation of relay $R^2$. Relay $R^2$ at $R^21$ removes a short circuit from the 1—2 winding of $K^2$. Relay $K^2$ operates in series with the cut through relays of the preceding switches. If, however, the call had been originated by a toll operator, a forward ground on the P lead prevents the operation of relay $K^2$ at this time. Relay $K^2$ is slightly slow to operate to prevent it from operating on any extraneous operation of relay $R^2$. Relay $K^2$ locks via its 3—4 winding to the ground provided by relay $B^2$ at $B^21$, at $K^23$ closes a locking circuit to relay $R^2$, at $K^24$ connects direct ground on the P lead and opens the circuit to its 1—2 winding, and at $K^25$ disables the pulsing contact $A^21$ in the pulsing circuit to the $DL^2$ lead. The relay $A^2$ is now disabled and no further digits can be sent to the distant office. The operation of relay $R^2$ at this time does not provide answer supervision (reversal of the line polarity) to the called party due to the unoperated condition of relay $H^2$.

*Call from toll operator to subscriber in Tributory Office*

The call is extended over the two-way trunk Tru2, Fig. 5, and the repeater Rep3 to an idle incoming selector IS3, which is stepped to its fifth level in which it hunts for an idle auto-to-auto repeater Rep2. These operations being accomplished as described in the preceding call.

The repeater Rep2 of Fig. 2 is seized and repeats impulses to the repeater, Fig. 1, at the Tributory Office, as described in connection with a call from a subscriber in the Tandem Office to a subscriber in the Tributory Office.

In the repeater of Fig. 1 at the Tributory Office, the impulse repeating and correcting relays L, T cause the setting of the succeeding local equipment and establish the connection to the wanted line as already described, and the called party is rung in known manner. When the call is answered, reversal of battery over the +SW and —SW leads causes ground on the lead DL to be replaced by battery resistance and the relay $G^2$, Fig. 2, in the Tandem Office repeater operates and closes a circuit for relay $H^2$ over $G^2$1, $B^2$2, $F^2$2, $C^2$1, $M^2$1. Relay $H^2$ locks to ground at $B^2$1 and $H^2$4 closes a circuit for relay $R^2$, which at $R^2$4 and $R^2$8 reverses battery over the +L and —L leads to give answer supervision to the operator. In this case, however, ground forwarded over the P lead from selector IS3 (Fig. 5) prevents the operation of relay $K^2$ and leaves relay $R^2$ under the control of relay $G^2$; also the pulsing contacts $A^2$1 are not shunted by contacts $K^2$5.

If the toll operator disconnects first, the replacement of resistance battery by ground on the lead $DL^3$ at the repeater of Fig. 3 releases relay $H^3$ which opens the circuit to relay $G^3$ and the circuit functions as already described in connection with the preceding call. Relay $G^3$ opens the loop circuit to the incoming local selector (IS3, Fig. 5) causing the release of relay $A^2$ in the repeater of Fig. 2 to which reference should now be made.

The release of relay $A^2$ releases relay $F^2$ and replaces resistance battery with ground on the $DL^2$ and +L and —L leads of the trunk (simplex) over the winding of relay $G^2$, thus giving distant disconnect supervision and reoperating relay $G^2$. Relay $F^2$ opens the circuit of relay $R^2$ at $F^2$4 (make) but an alternate circuit to relay $R^2$ is closed over $G^2$1, $B^2$2, $F^2$2 (break), $H^2$4 and $K^2$2. Relay $R^2$ maintains relay $B^2$ operated. If $R^2$ releases momentarily during the transfer time of its holding circuit, $B^2$ remains operated since it is slow to release. When the distant equipment is released, $G^2$ releases and, in turn, releases $R^2$, $B^2$ and $H^2$. Relay $C^2$ operates during the release of $B^2$ and closes a circuit to $M^2$. $M^2$ places a ground on the $P^2$ lead to maintain the repeater busy until all relays are released. Relay $M^2$ removes ground from the P lead, allowing the preceding switches to release, and this circuit is ready for the next call.

In the repeater, Fig. 1, at the Tributory Office, the replacement of resistance battery with ground over the +L and —L lead of the trunk and the lead DL operates relay G which releases relay S, causing the release in turn of relays D, U and A. Relay U opens the loop to the succeeding equipment and relay F restores and in turn releases relays B and H. Relay A replaces resistance battery with ground to the winding of relay G, which releases. The circuit is now ready for the next call.

If the called party at the Tributory Office disconnects first, a succeeding switch reverses battery over the leads +SW and —SW causing relay F to restore. Relay F opens the circuit to relay S and a multiple circuit to relay B, prepares an alternate circuit to relay S and releases relay A. Relay A replaces resistance battery with ground to the winding of relay G thus giving the operator disconnect supervision. Relay G also recloses the circuit to relay S.

In the repeater at the Tributory Office, Fig. 2, relay $G^2$ operates and releases relay $R^2$ which reverses battery towards the operator in order to give disconnect supervision, and closes part of the circuit of relay $C^2$. The battery reversal causes relay $E^3$, Fig. 3, in the auto-to-auto manual repeater to restore and this circuit functions in the manner described in connection with a call from the toll operator to a subscriber in the Tandem Office.

When the operator disconnects, the replacement of resistance battery with ground on the lead $DL^3$ opens the circuit to relay $H^3$ which restores and deenergizes relay $G^3$. Relay $G^3$ opens the loop circuit to the succeeding local incoming selector causing it to restore.

In the repeater, Fig. 2, relay $A^2$ is released and, in turn releases relay $F^2$. Relay $A^2$ replaces resistance battery with resistance ground on the lead $DL^2$ and on the +L and —L leads of the trunk (simplex) over the winding of relay $G^2$, thus allowing the succeeding equipment to release and releasing $G^2$. Relays $B^2$ and $H^2$ restore. Relay $C^2$ operates during the release time of relay $B^2$ and operates relay $M^2$. Relay $M^2$ grounds the P lead to maintain the circuit busy to provide time for the succeeding equipment to release. Relay $C^2$ releases and releases $M^2$. Relay $M^2$ removes ground from the P lead, allowing the preceding switches to restore, and this circuit is ready for the next call.

In the repeater, Fig. 1, at the Tributory Office the replacement of battery resistance with ground over the lead DL causes the release of relay G and in turn relays S, B, D, U and H are released.

*Verification call from toll operator to subscriber in Tributory Office*

The call is extended to the incoming selector IS1, Fig. 5, under the control of the toll operator as described in connection with a call from the toll operator to a Tributory Office subscriber. The operator then dials the thousands digit 0 to seize and idle Verification Distributor, Fig. 4, which sends a preliminary reverse battery signal lasting about 100 milliseconds to the preceding equipment as already described.

In the repeater, Fig. 1, upon the reversal of battery over the —SW and +SW leads relay F will operate and, in turn, operate relay A. Relay A replaces ground on the lead DL with resistance battery to repeat the signal to the Tandem Office. At the same time, a circuit will be closed over F2 to relay H. H will not operate during the preliminary reverse battery signal due to the long delay provided by the thermistor TH. When the reverse battery signal is removed in approximately 100 milliseconds, relay F releases and, in turn, releases relay A. Relay A removes the signal from the distant equipment and prepares for the next digit. Relay F, on release, opens the circuit to relay H. Relay D is held during this interval via the rectifier MRB, and contacts H3, B4, U6.

When a selector stops on the terminals assigned to the verification distributor, Fig. 4, relay $A^4$ operates over the incoming loop and energizes relay $B^4$ which prepares the impulsing circuit to the stepping magnet OM of the minor switch MS and the winding of relay $C^4$ in parallel.

The circuit is now prepared to receive further dial impulses. Relay $A^4$ releases for each dial impulse received, opening the circuit to relay $B^4$ and closing the circuit to the minor switch magnet OM and relay $C^4$ winding (1—2) in parallel. The minor switch wipers are driven to the first terminal of the bank as OM is energized, thus operating its off normal springs CM. The CM springs open the circuit to the pre-energizing winding of relay $C^4$ and close part of the circuit to release magnet ZM. Relay $B^4$ is slow to release and remains operating during impulsing. Relay $C^4$ remains operated via its 1—2 winding.

Relay $A^4$ reoperates on the next loop closure, closing the circuit to relay $B^4$, releasing the minor switch magnet OM, and opening the circuit to relay $C^4$. Relay $C^4$ is slow to release and remains operated during impulsing. The above cycle of the release of relay $A^4$ and the operation of magnet OM and the holding of relay $C^4$ is repeated until the complete digit is received positioning the minor switch wipers on the dialed terminal. When relay $A^4$ remains operated at the end of the digit, relay $C^4$ releases closing a circuit to relay $D^4$.

Relay $D^4$ operates, transferring the — and + leads from the windings of relay $A^4$ to the MS1 and MS2 wipers respectively and extending the loop connection to a verification connector CON2, Fig. 5, having access to the wanted line.

The circuit is now held under control of a ground forwarded over the P lead. Relay $A^4$ releases after relay $D^4$ operates, releasing relay $B^4$. The circuit to the release magnet ZM is held open by a break contact $D^4$4 of relay $D^4$.

The P lead is common to all the verification connectors (this limits the verification trunk group to 1) and is extended to the P lead of the calling line via the connector which responds to the tens and units digits in known manner. If the called line is busy, relay $C^4$ reoperates via its (3—4) winding from the ground on the called subscriber's P lead. Relay $C^4$, when reoperated, reverses the polarity via its $C^42$ and $C^43$ contacts to the preceding equipment prior to cut through to the + and — leads of the called line thus providing a busy signal to the operator without interference to the established connection.

If the line is idle, the operator does not receive answer supervision and cannot signal the line as no ringing provisions are provided.

The circuit is released when the loop to the + and — leads is opened and the ground is removed from the P lead consequent upon the operator disconnecting. Relay $D^4$ releases and closes a circuit to ZM and recloses a ground to the P lead to maintain the switch busy until it completes its release. The circuit to the connector is opened when this circuit releases, opening the circuit to the 3—4 winding of relay $C^4$ if operated.

*Call from subscriber in Tandem Office to toll operator*

The call is extended over a subscriber's line circuit LC2, Fig. 5, line finder LF1, group selector GS2 (10th level) repeater Rep3 and trunk Tru2 to the toll operator's position TB.

In this case the repeater Rep3, Fig. 3, is taken into use over the path of access —L(1), +L(1) and operates in the same manner as previously described in connection with a call from the Tributory Office with the exception that the operation of relay $M^3$ does not reverse the polarity of the line —L(1) and +L(1), since it is not necessary to provide answer supervision on calls from the local office.

*Call from toll operator to subscriber in Tandem Office*

When a call is initiated by the operator over the two-way trunk Tru2, Fig. 5, battery is applied over the trunk conductors to the lead $DL^3$, Fig. 3.

Relay $G^3$ operates, at $G^3$1 closes the circuit to relay $D^3$, and at $G^3$2 closes part of the circuit for seizing the succeeding local equipment (e. g. the incoming selector IS3, Fig. 5). Relay $D^3$ operators, at $D^3$2 prepares the circuit to relay $C^3$, at $D^3$4 places ground on the P sw lead to provide a toll marking to the succeeding local equipment and closes the circuit to relay $L^3$, at $D^3$1 removes the 600 ohms termination $YD^3$ from the line, and at $D^3$5 closes the circuit to the 1—2 winding of relay $H^3$. Relay $H^3$ operates and at $H^3$1 prepares a local circuit for relay $G^3$. Relay $L^3$ operates, at $L^3$1 removes ground from the ATB lead to provide for metering an all trunks busy condition and places ground on the P lead to make this circuit busy to outgoing calls, at $L^3$2 and $L^3$3 disconnects the winding of relay $A^3$ and closes the circuit for seizing the succeeding local equipment over the +SW and —SW leads over contacts $L^3$5, $G^3$2, $L^3$4, $L^3$2, $L^3$3, and $L^3$6 and through the series parallel combination of relay $E^3$ and rectifiers $MRA^3$1 and $MRA^3$2. The unidirectional characteristics of $MRA^3$1 prevent relay $E^3$ from operating over the loop circuit to the succeeding equipment at this time. The succeeding local equipment, on being seized, returns ground over the P sw lead, thus closing a parallel circuit to relay $L^3$.

Relay $G^3$ follows the impulses received over the $DL^3$ lead and when at normal, opens the circuit to relay $D^3$, closes the circuit to relay $C^3$, and at $G^3$2 opens the loop circuit to the succeeding local equipment. Relay $C^3$ operates on the first impulse of each series and at $C^3$1 shunts the winding 3—4 of the repeating coil $RC^3$ with resistance $YB^3$ to improve impulsing conditions.

After the last impulse of each series, relay $G^3$ remains operated, opening the circuit to relay $C^3$, closing the circuit to relay $D^3$ and closing the loop circuit to the succeeding local equipment. Relays $C^3$ and $D^3$ are slow to release and remain operated during impulsing. Relay $C^3$, on restoring after the last impulse of each series, removes the shunt from winding 3—4 of repeating coil $RC^3$.

The succeeding local equipment follows the impulses received, establishes a connection to the dialed line and signals the dialed subscriber all in well-known manner.

When the call is answered, a succeeding local switch reverses battery over the +SW and —SW leads, causing relay $E^3$ to operate.

Relay $E^3$, on operating, at $E^3$1 closes the circuit to relay $J^3$ and closes the circuit to the 1—2 and 3—4 windings of H in series over contacts $E^3$2, $J^3$2, $D^3$5 and protective resistor $YA^3$. Relay $J^3$ operates, at $J^3$2 transfers the lead $DL^3$ from ground through relay $G^3$ to ground through the 1—2 and 3—4 windings of relay $H^3$, giving high-resistance answer supervision to the distant office, at $J^3$3 closes a local holding circuit to relay $G^3$, and closes over $J^3$1, $B^3$4 its own locking circuit. Relay $H^3$ remains operated over its 1—2 and 3—4 windings to battery over lead $DL^3$.

When the dialed party disconnects first, a succeeding local switch reverses battery over the +SW and —SW leads, causing relay $E^3$ to restore.

Relay $E^3$ upon restoring, removes at $E^3$1 a multiple ground from the P lead and replaces at $E^3$2 the ground to the lead $DL^3$ through the 1—2 and 3—4 windings of $H^3$ with ground through the 1—2 windings of $H^3$ to give low resistance disconnect supervision to the distant office. Relay $H^3$ remains operated over its 1—2 winding from battery forwarded over the lead $DL^3$. When the operator in the distant office disconnects, the equipment in the distant office replaces resistance battery on the lead $DL^3$ with ground, thus opening the circuit to the 1—2 winding of relay $H^3$. Relay $H^3$ restores and opens the circuit to relay $G^3$. Relay $G^3$ restores and at $G^3$2 opens the loop circuit to the succeeding local equipment, allowing it to restore. Relay $G^3$ also at $G^3$1 opens the circuit to relay $D^3$ and closes the circuit to relay $C^3$. Relay $C^3$ operates and at $C^3$2 prepares the peg count metering circuit over wire PC. Relay $D^3$ restores, at $D^3$2 opens the circuit to relay $C^3$, and removes a multiple ground from the P sw lead at $D^3$4.

The succeeding local equipment removes ground from the P sw lead, thus opening the circuit to relay $L^3$. Relay $L^3$ restores, at $L^3$1 places ground on the ATB lead and on the PC lead to the peg count before relay $C^3$ restores, and opens the circuit to relay $J^3$. Relay $C^3$ restores and opens the circuit to the PC lead and relay $J^3$ restores.

When the operator disconnects first, the equipment in the distant office replaces resistance battery on the lead $DL^3$ with ground, thus opening the circuit to relay $H^3$. Relay $H^3$ restores and at $H^3$1 opens the circuit to relay $G^3$. Relay $G^3$ restores and the circuit functions as already explained in connection with release when the called party disconnects first.

While there has been shown and described the application of our invention to a single modification it will be understood that various omissions and substitutions and changes in the details of the apparatus illustrated in its operation may be made by those skilled in the art without departing from the spirit of our invention. It is the intention, therefore, to be limited only by the scope of the following claims.

What is claimed is:

1. In a telephone system, a first automatic exchange, a first impulse repeater in said first automatic exchange, a second automatic exchange, a second impulse repeater in said second automatic exchange, a trunk line extending from said first impulse repeater to said second impulse repeater, an operator's toll board, automatic switch means for extending a connection from a subscriber in said second exchange to a subscriber in said first exchange, automatic switch means in said first exchange specially assigned for use only by the toll operator, means for extending a connection from said toll board over said second repeater, said trunk line, said first repeater and said specially assigned switch means, means for transmitting a signal from said toll board to said second repeater when said last-mentioned connection is initiated, means in said specially assigned switch means for sending a signal to said second repeater during an interdigital period, means in said second repeater responsive to said signal from said specially assigned switch means for preventing the repetition of further impulses over said trunk line to said first repeater, and means in said second repeater responsive to said signal from said toll board for blocking the operation of said impulse-preventing means.

2. In a telephone system, a first automatic exchange, a first impulse repeater in said first automatic exchange, a second automatic exchange, a second impulse repeater in said second automatic exchange, a trunk line extending from said first impulse repeater to said second impulse repeater, an operator's toll board, automatic switch means for extending a connection from a subscriber in said second exchange to a subscriber in said first exchange, automatic switch means in said first exchange specially assigned for use only by the toll operator, a line comprising a pair of talking conductors extending from said first repeater and over which access is had to said specially assigned switch means, means for extending a connection from said toll board over said second repeater, said trunk line, said first repeater and said pair of talking conductors to said specially assigned switch means, means for transmitting a signal from said toll board to said second repeater when said connection is initiated, means in said specially assigned switch means for sending a reverse battery signal over said pair of talking conductors to cause the sending of a signal to said second repeater during an interdigital period, means in said second repeater responsive to said signal for preventing the repetition of further impulses over said trunk line to said first repeater, and means in said second repeater responsive to said signal from said toll board for blocking the operation of said impulse-preventing means.

3. In a telephone system, a first automatic exchange, a first impulse repeater in said first automatic exchange, a second automatic exchange, a second impulse repeater in said second automatic exchange, a trunk line extending from said first impulse repeater to said second impulse repeater, an operator's toll board, automatic switch means for extending a connection from a subscriber in said second exchange to a subscriber in said first exchange, automatic switch means in said first exchange specially assigned for use only by the toll operator, a line comprising a pair of talking conductors extending from said first repeater and over which access is had to said specially assigned switch means, means for extending a connection from said toll board over said second repeater, said trunk line, said first repeater and said pair of talking conductors to said specially assigned switch means, means for transmitting a signal from said toll board to said second repeater when said connection is initiated, means in said specially assigned switch means for sending a revesse battery preliminary answer signal over said pair of talking conductors to said first repeater during an interdigital period, means in said first repeater responsive to said battery reversal for sending a signal over the two conductors of said trunk line in simplex, means in said second repeater responsive to said last-mentioned signal for preventing the repetition of further impulses over said trunk line to said first repeater, and means in said second repeater responsive to said signal from said toll board for blocking the operation of said impulse-preventing means.

4. In a telephone system, a first automatic exchange, a first impulse repeater in said first automatic exchange, a tandem automatic exchange, a second impulse repeater in said tandem automatic exchange, a first trunk line extending between said first and second repeaters, a third impulse repeater at said tandem automatic exchange, an operator's toll board, a second trunk line extending from said third repeater to said toll board, switch means for extending a connection from a subscriber in said tandem exchange to a subscriber in said first automatic exchange over said second and first repeaters and said first trunk line, switch means in said first automatic exchange specially assigned for use only by the toll operator, means for extending a connection from said operator's toll board to a subscriber in said first automatic exchange over said third, second and first repeaters, said second and first trunk lines and said specially assigned switch means, means for transmitting a signal from said toll board over said second trunk line and said third repeater to said second repeater when said last-mentioned connection is initiated, means in said specially assigned switch means for sending a signal to said second repeater during an interdigital period, means in said second repeater responsive to said last-mentioned signal for preventing the repetition of further impulses, and means in said second repeater responsive to said signal from said toll board for blocking the operation of said impulse-preventing means.

5. In a telephone system, a first automatic exchange, a first impulse repeater in said first automatic exchange, a tandem automatic exchange, a second impulse repeater in said tandem automatic exchange, a first trunk line extending between said first and second repeaters, a third impulse repeater at said tandem automatic exchange, an operator's toll board, a second trunk line extending from said third repeater to said toll board, switch means for extending a connection from a subscriber in said tandem exchange to a subscriber in said first automatic exchange over said second and first repeaters and said first trunk line, switch means in said first automatic exchange specially assigned for use only by the toll operator, means for extending a connection from said operator's toll board to a subscriber in said first automatic exchange over said third, second and first repeaters, said second and first trunk lines and said specially assigned switch means, means for transmitting a signal from said toll board to said second repeater over said second trunk line and said third repeater when said last-mentioned connection is initiated, means in said specially assigned switch means for sending a signal to said second repeater during an interdigital period, impulse repeating contacts in said second repeater, means in said second repeater for testing for the presence or absence of said signal during said interdigital period, means responsive to said signal for rendering said impulse repeating contacts ineffective, and means in said second repeater responsive to said signal from the toll board for blocking the operation of said means for rendering said impulse-repeater contacts ineffective.

6. In a telephone system, a first automatic exchange, a first impulse repeater in said first automatic exchange, a tandem automatic exchange, a second impulse repeater in said tandem automatic exchange, a first trunk line extending between said first and second repeaters, a third impulse repeater at said tandem automatic exchange, an operator's toll board, a second trunk line extending from said third repeater to said toll board, switch means for extending a connection from a subscriber in said tandem exchange to a subscriber in said first automatic exchange over said second and first repeaters and said first trunk line, a verification distributor switch in said first automatic exchange specially assigned for use only by the toll operator, means for extending a connection from said operator's toll board to a subscriber in said first automatic exchange over said third, second and first repeaters, said second and first trunk lines and said verification distributor switch, means for transmitting a signal from said toll board to said second repeater over said second trunk line and said third repeater when said last-mentioned connection is initiated, means in said verification distributor switch for sending a signal to said second repeater during an interdigital period, impulse repeating contacts in said second repeater, means in said second repeater for testing for the presence or absence of said last-mentioned signal during said interdigital period, means responsive to said last-mentioned signal for rendering said impulse repeating contacts ineffective, and means responsive to said toll board signal for blocking the operation of said means for rendering said impulse-repeater contacts ineffective.

7. In a telephone system, a first automatic exchange, a first impulse repeater in said first automatic exchange, a tandem automatic exchange, a second impulse repeater in said tandem automatic exchange, a first two-way trunk line extending between said first and second repeaters, a third impulse repeater at said tandem automatic exchange, an operator's toll board, a second two-way trunk line extending from said third repeater to said toll board, switch means for extending a connection from a subscriber in said tandem exchange to a subscriber in said first automatic exchange over said second and first repeaters and said first trunk line, switch means in said first automatic exchange specially assigned for use only by the toll operator, means for extending a connection from said operator's toll board to a subscriber in said first automatic exchange over said third, second and first repeaters, said second and first trunk lines and said specially assigned switch means, means for transmitting a signal from said toll board to said second repeater over said second trunk line and said third repeater when said last-mentioned connection is initiated, means in said specially assigned switch means for sending a signal to said second repeater during an interdigital period, means in said second repeater responsive to said last-mentioned signal for preventing the repetition of further impulses, and means responsive to said toll board signal for blocking the operation of said means for preventing the repetition of further pulses.

8. In a telephone system, a first automatic exchange, a first impulse repeater in said first automatic exchange, a second automatic exchange, a second impulse repeater in said second automatic exchange comprising a pair of impulse repeating contacts, a trunk line extending from said first impulse repeater to said second impulse repeater, an operator's toll board, automatic switch means for extending a connection from a subscriber in said second exchange to a subscriber in said first exchange, automatic switch means in said first exchange specially assigned for use only by the toll operator, a line comprising a pair of talking conductors extending from said first repeater and over which access is had to said specially assigned switch means, means for extending a connection from said toll board over said second repeater, said trunk line, said first repeater and said pair of talking conductors to said specially assigned switch means, means in said specially assigned switch means for sending a reverse battery preliminary answer signal over said pair of talking conductors to said first repeater during an interdigital period, means for testing for the presence or absence of said preliminary answer signal during said interdigital period, means in said first repeater responsive to said battery reversal for sending a signal over the two conductors of said trunk line in simplex, means in said second automatic exchange for discriminating between connections set up to said second repeater from said toll board and from a local substation in said second automatic exchange, means for rendering said impulse-repeating contacts ineffective, and means for controlling said last-mentioned means jointly dependent upon the operation of said testing means and said discriminating means.

9. In a telephone system, the combination according to claim 8 in which said second impulse repeater comprises a first slow release relay, means for energizing said relay during the transmission of impulses and deenergizing said relay during interdigital periods, the means responsive to said signal sent over the two conductors of said trunk line in simplex, comprising a second relay, a third relay, and a circuit for said third relay including front contacts of said first relay and back contacts of said second relay, the means for controlling the ineffectiveness of the impulse-repeating contacts comprising a fourth relay having a winding normally connected to a private wire, a short circuit for said winding including back contacts of said third relay, and front contacts on said fourth relay for shunting said impulse repeating contacts.

10. In a telephone system, the combination according to claim 8 in which said first impulse repeater comprises a pair of impulse repeating contacts, a first relay responsive to reverse battery signals, a second relay having normally connected in its circuit a thermistor and back contacts of said first relay, a third relay adapted to be operated when said first repeater is seized over said first trunk line, a short circuit for said thermistor including back contacts of said third relay, and means under the control of said second relay for rendering said impulse repeating contacts ineffective, said thermistor having such characteristics that said second relay does not operate during the duration of said preliminary answer signal.

11. In a telephone system, a first automatic exchange, a first impulse-repeater in said first automatic exchange, a second automatic exchange, a second impulse repeater in said second automatic exchange, a trunk line extending from said first impulse-repeater to said second impulse-repeater, an operator's toll board, means for connecting said toll board to said second repeater, automatic switch means for extending a connection from a subscriber in said first exchange either to a subscriber in said second exchange or to said toll board, first and second paths of access over which said first impulse repeater may be seized by a calling party in said first exchange, and means in said first repeater responsive to its seizure over one of said paths of access for automatically transmitting a predetermined number of impulses over said trunk line to route the call to said operator's toll board, said first impulse-repeater comprising a pulsing circuit for transmitting impulses over said trunk line, a first slow-release relay, a second relay connected only to one of said paths of access, a circuit for said first relay including back contacts of said second relay, means for energization of said second relay responsive to the seizure of said repeater over said last-mentioned path of access, and means for opening said pulsing circuit during the energization of the second relay and the relapse of the first relay.

References Cited in the file of this patent

UNITED STATES PATENTS

| | | |
|---|---|---|
| 2,431,321 | Gohorel | Nov. 25, 1947 |
| 2,678,355 | Pharis | May 11, 1954 |